United States Patent
Watanabe et al.

(10) Patent No.: US 7,639,705 B2
(45) Date of Patent: Dec. 29, 2009

(54) PACKET FORWARDING APPARATUS WITH FUNCTION OF DIVERTING TRAFFIC

(75) Inventors: Rinne Watanabe, Yokohama (JP); Takeki Yazaki, Hachioji (JP)

(73) Assignee: Alaxala Networks Corporation, Kanagawa (JP)

( * ) Notice: Subject to any disclaimer, the term of this patent is extended or adjusted under 35 U.S.C. 154(b) by 643 days.

(21) Appl. No.: 11/365,607

(22) Filed: Mar. 2, 2006

(65) Prior Publication Data

US 2007/0091911 A1 Apr. 26, 2007

(30) Foreign Application Priority Data

Oct. 7, 2005 (JP) ............................. 2005-294273

(51) Int. Cl.
H04L 12/56 (2006.01)
H04J 1/16 (2006.01)
(52) U.S. Cl. .................... 370/419; 370/216; 370/389
(58) Field of Classification Search ................ 370/392, 370/217, 218, 221, 225, 243, 244, 216, 389, 370/419; 714/2, 3
See application file for complete search history.

(56) References Cited

U.S. PATENT DOCUMENTS

| | | | |
|---|---|---|---|
| 2002/0114276 A1* | 8/2002 | Basturk | 370/230 |
| 2002/0172150 A1* | 11/2002 | Kano | 370/216 |
| 2003/0043736 A1* | 3/2003 | Gonda | 370/218 |
| 2003/0233595 A1* | 12/2003 | Charny et al. | 714/4 |
| 2005/0188100 A1* | 8/2005 | Le Roux et al. | 709/238 |
| 2006/0072574 A1* | 4/2006 | Akahane et al. | 370/392 |
| 2006/0182035 A1* | 8/2006 | Vasseur | 370/238 |
| 2006/0221813 A1* | 10/2006 | Scudder et al. | 370/216 |
| 2008/0215910 A1* | 9/2008 | Gabriel et al. | 714/4 |

OTHER PUBLICATIONS

"Fast Reroute Extensions to RSVP-TE for LSP Tunnels" By P. Pan, et al, RFC 4090, Internet Drafts May 2005, pp. 1-30.
"Link Aggregation With 802.3ad" by J. Kuciel, Network World, Nov. 2000, pp. 1-2.

* cited by examiner

Primary Examiner—John Pezzlo
(74) Attorney, Agent, or Firm—Brundidge & Stanger, P.C.

(57) ABSTRACT

A packet forwarding apparatus is provided which can minimize traffic detoured to a backup path liable to be degraded in communication quality in the event of a link failure to thereby improve the communication quality. To this end, a technique is provided in which an output label decision unit and an output physical port ordinal number search unit which are included in a destination decision unit decide, from a header of an input packet, an output label of the packet, a first logical link to which the packet is to be outputted and a first physical link constituting the first logical link. When a failure takes place in the first physical link, the detour decision unit changes the output label to a backup label and the first physical link to a second physical link constituting a second logical link.

7 Claims, 10 Drawing Sheets

FIG. 6

300A OUTPUT LABEL TABLE

| ADDRESS | VALID BIT | OUTPUT LABEL | LABEL OPERATION | NHIP | OUTPUT PORT ORDINAL NUMBER | DETOUR THRESHOLED | LOGICAL INTERFACE BIT |
|---|---|---|---|---|---|---|---|
| 0 | 0 | 0 | 0 | 0 | 0 | 0 | 0 |
| 1 | 0 | 0 | 0 | 0 | 0 | 0 | 0 |
| --- | --- | --- | --- | --- | --- | --- | --- |
| 20 | 1 | 200 | SWAP | 192.168.02 | 1 | 3 | 1 |
| 21 | 1 | 210 | SWAP | 192.168.02 | 1 | 2 | 1 |
| 22 | 1 | 220 | SWAP | 192.168.02 | 1 | 1 | 1 |
| --- | --- | --- | --- | --- | --- | --- | --- |

300B OUTPUT LABEL TABLE

| ADDRESS | VALID BIT | OUTPUT LABEL | LABEL OPERATION | NHIP | OUTPUT PORT ORDINAL NUMBER | LOGICAL INTERFACE BIT |
|---|---|---|---|---|---|---|
| 0 | 0 | 0 | 0 | 0 | 0 | 0 |
| 1 | 0 | 0 | 0 | 0 | 0 | 0 |
| --- | --- | --- | --- | --- | --- | --- |
| 20 | 1 | 2000 | PUSH | 192.168.52 | 4 | 0 |
| 21 | 1 | 2100 | PUSH | 192.168.52 | 4 | 0 |
| 22 | 1 | 2200 | PUSH | 192.168.52 | 4 | 0 |
| --- | --- | --- | --- | --- | --- | --- |

FIG. 7

410 PHYSICAL PORT ORDINAL NUMBER TABLE

| ADDRESS | VALID BIT | LOGICAL PORT ORDINAL NUMBER | PHYSICAL PORT ORDINAL NUMBER | PHYSICAL PORT ORDINAL NUMBER FIELD | | | | | 410-1 |
|---|---|---|---|---|---|---|---|---|---|
| | | | | 1 | 2 | 3 | 4 | 5 | ..... |
| 0 | 1 | 1 | 10 | 1 | 2 | 3 | 0 | 0 | ..... |
| 1 | 0 | 2 | 0 | 0 | 0 | 0 | 0 | 0 | ..... |
| 2 | 0 | 3 | 0 | 0 | 0 | 0 | 0 | 0 | ..... |
| 3 | 0 | 4 | 0 | 0 | 0 | 0 | 0 | 0 | ..... |
| ..... | ..... | ..... | ..... | ..... | ..... | ..... | ..... | ..... | ..... |

FIG. 9

Config# mpls in_label 20
PROMPT — 901

Config(in_label20)# out_label 200 swap nhip 192.168.0.2 out_if la1
PROMPT — 911 — 912 — 913
910

Config(in_label20)# backup_lsp out_label 2000 push nhip 192.168.5.2 out_if 4
PROMPT — 921 — 922 — 923 — 924
920

Config# mpls in_label 20
PROMPT — 931

Config(in_label20)# out_label 200 swap nhip 192.168.0.2 out_if la1 threshold 10
PROMPT — 941 — 942 — 943 — 944
940

Config(in_label20)# backup_lsp out_label 2000 push nhip 192.168.5.2 out_if 4
PROMPT — 951 — 952 — 953 — 954
950

PACKET FORWARDING APPARATUS WITH FUNCTION OF DIVERTING TRAFFIC

INCORPORATION BY REFERENCE

The present application claims priority from Japanese application JP2005-294273 filed on Oct. 7, 2005, the content of which is hereby incorporated by reference into this application.

BACKGROUND OF THE INVENTION

The present invention relates to a technical field of a packet forwarding apparatus having the function to protect traffic in a packet forwarding network.

A high availability technology has been developed for realizing continuation of communication in the event that nodes constituting a network and their physical links become faulty. This type of technique is exemplified by a fast reroute technique of preventing communication interruption in an MPLS (Multi Protocol Label Switching) network. And also, IEEE Internet Draft draft-ietf-mpls-rsvp-lsp-fastreroute-07.txt "Fast Reroute Extensions to RSVP-TE for LSP Tunnels" (RFC 4090), May 2005 (Document 1) describes a one-to-one backup system and a facility backup system, as a system for protecting traffic flowing through an LSP (Label Switching Path) (called a protected LSP) representing a path. In the one-to-one backup system, a single backup LSP is set in association with the protected LSP and in the facility backup system, a single backup LSP is set in association with a plurality of protected LSP's. In the event that a failure takes place in either a node or a physical link by way of which the protected LSP runs, traffic flowing in this LSP is detoured to the backup LSP to thereby materialize communication continuation in the event of the occurrence of the failure.

As another example of the high availability technology, one may refer to a link aggregation technology described in, for example, IEEE802.3ad (http://www.itworld.com/Net/1750/NWW001113tech/pfindex.html), Nov. 13, 2000 (Document 2). In the above technology, a plurality of physical links are treated as a single logical link and a frame is distributed to the plural physical links to make communication. Even when one of the physical links of the logical link becomes faulty, at least one physical link remains sound and communication between switches interconnected by the logical link can be prevented from being interrupted. Accordingly, by interconnecting the switches by the logical link of link aggregation, communication continuation in the event of occurrence of a failure in one physical link can be assured.

SUMMARY OF THE INVENTION

In a network to which teachings of Document 2 are applied, continuation of communication can be assured when a failure occurs in a physical link forming a part of a logical link but there arises a problem that communication is kept from continuing in the event of the occurrence of a fault in a node.

On the other hand, in a network to which teachings of Document 1 is applied, communication can continue in the event of the occurrence of a failure in a node by using a backup LSP unless the backup LSP runs by way of the faulty node. But, an instance may be conceivable in which at the time or setting the protected LSP and backup LSP, a path meeting communication quality (such as communication delay) necessary for individual traffic does not exist excepting the path for protected LSP. In such a case, when a failure takes place in a node or a physical link, communication can continue, on the one hand, at the cost of an increased delay in communication of traffic detoured to the backup LSP or, on the other hand, with part of traffic discarded.

Accordingly, an object of the present invention is to provide a packet forwarding apparatus which can realize communication continuation in the event of occurrence of a failure in a node, while suppressing traffic to be detoured to a minimum so as to suppress degradation in the communication quality of the traffic to a minimum.

To accomplish the above object, according to the present invention, a packet forwarding apparatus is provided which comprises, for example, a plurality of input links and a plurality of output ports and a destination decision unit for deciding, from information in a header of a packet inputted from an input link, a first logical interface comprised of at least one output port and a first output port constituting the first logical interface so that the packet may be transmitted to the first output port, wherein when a failure occurs in the first output port of the first logical interface, the destination decision unit changes the first output port to a second output port constituting a second logical interface.

Other problems, means and advantages than the above will become apparent from embodiments to be described hereinafter.

When a failure occurs in part of physical ports constituting a logical interface, it is sufficient that traffic is detoured by an amount corresponding to a band of a faulty port and there is no need of detouring traffic by an amount corresponding to the total band of the logical interface. Accordingly, the traffic to be detoured can be minimized to minimize degradation in the communication quality of the traffic. In addition, when a failure occurs in a node, traffic flowing in the logical interface can all be detoured to also realize communication continuation.

BRIEF DESCRIPTION OF THE DRAWINGS

FIG. 6 is a table showing examples of output label tables 300A and 300B in FIG. 3.

FIG. 7 is a table showing an example of a physical port number table 410 in FIG. 4.

FIG. 9 is a diagram showing an example of input commands for setting the output label tables 300A and 300B.

DESCRIPTION OF THE EMBODIMENTS

Referring now to FIGS. 1 to 10, a preferred embodiment of the present invention will be described. It should however be understood that the invention is in no way limited to the embodiment.

(1) Outline of Network

Figure 10:
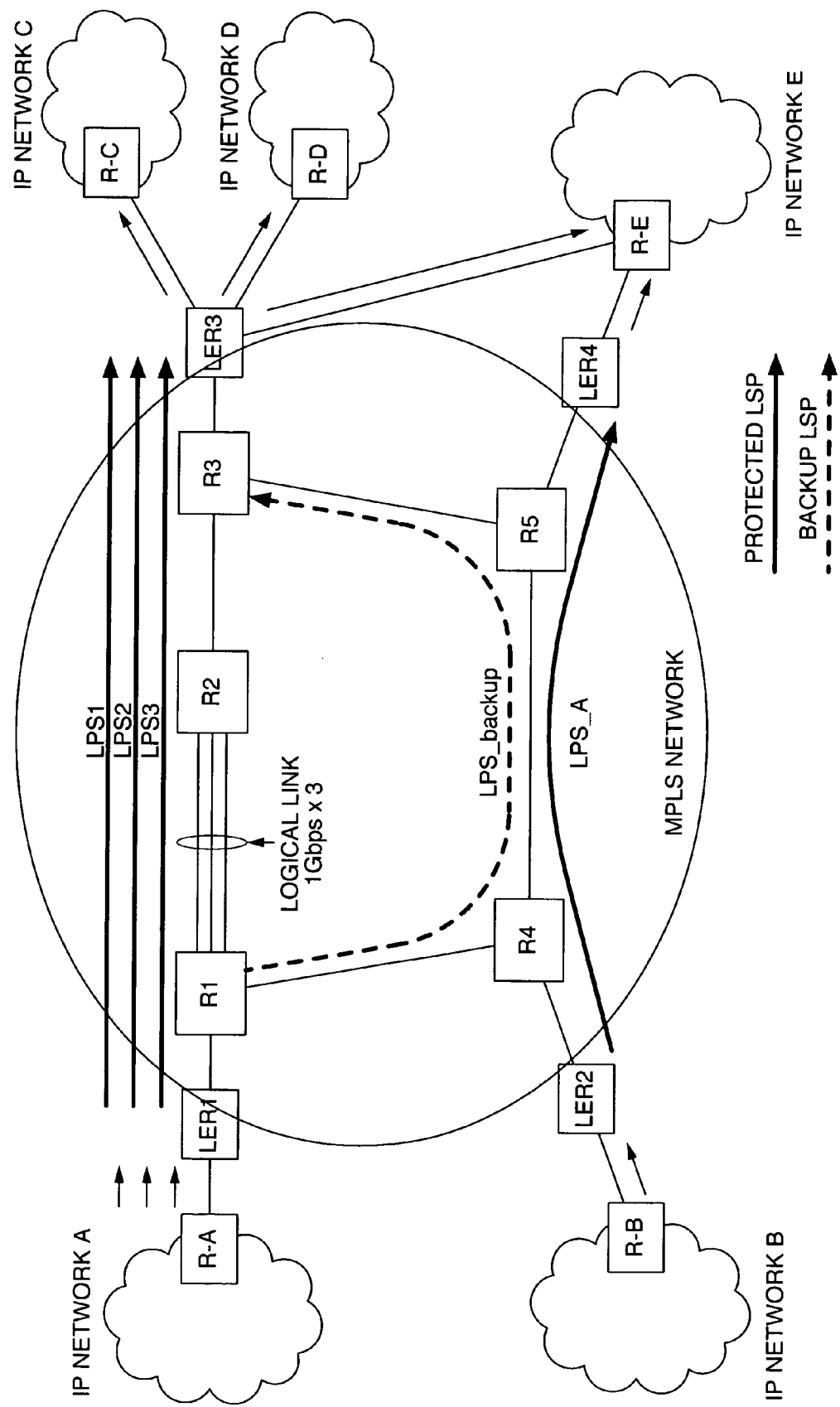
FIG. 10 is a diagram showing an example of an MPLS network.

Referring first to FIG. 10, there is illustrated an example of configuration of a network in the present embodiment. In FIG. 10, internet protocol (IP) networks A to E are different ones. Label edge routers (LER's) LER 1 to LER4 have each the function of adding a label, in which such information as destination IP address and destination port number is collected intensively, to an IP packet transmitted from an IP network to form the IP packet into an MPLS packet and transmitting it to an MPLS network. The label is information for identifying an explicit path (LSP) of traffic in the MPLS network. The label edge router also has the function to delete the label from the MPLS packet transmitted from the MPLS network so as to send a resulting IP packet to an IP network. Denoted by R1 to R5 are MPLS core routers, each of which has the function to forward (label switch) an MPLS packet on the basis of a value of its label. Denoted by R-A to R-E are IP routers, each of which functions to forward an IP packet. The MPLS core routers R1 and R2 are connected together by three physical links of 1 Gbps and the three physical links are aggregated (grouped or ganged through, for example, link aggregation) and handled as a single logical link A having a bandwidth of 3 Gbps. Interconnection among other routers is established by a link of 10 Gbps. In the MPLS core router R1, the physical links constituting the logical link A are of ordinal numbers of Nos. 1 to 3 and a physical link No. 4 is connected to the MPLS core router R4.

Label switching paths LSP1 to LSP3 run through the label edge router LER1, MPLS core routers R1 to R3 and label edge router LER3 and a band of 1 Gbps is subscribed to each of the LSP's. As a path for a host in the IP network B to communicate with a host in the IP network E, a label switching path LSP_A routing through the label edge router LER2, MPLS core routers R4 and R5 and label edge router LER4 is set up, having a band of a maximum of 8 Gbps subscribed thereto. In preparation for a link failure in a link interconnecting the MPLS core routers R1 and R2 and a failure in the MPLS core router R3, a backup LSP_backup is set up as a backup LSP of each of the protected label switching paths LSP1 to LSP3. Each backup LSP_backup is a path running through the MPLS core routers R1, R4, R5 and R3. A band of 3 Gbps is subscribed to the backup LSP_backup.

In order to permit a host in the IP network A to communicate with a host in the IP networks C, D or E, the IP router R-A is connected to the label edge router LER1, and IP routers R-C, R-D and R-E are connected to the label edge router LER3. Pieces of IP traffic transmitted from the IP network A and destined for the IP networks C to E are added with labels different for the destinations by means of the label edge router LER1 and are respectively forwarded along the label switching paths LSP1 to LSP3 corresponding to the individual labels.

The label switching paths LSP1 to LSP3 are optimum paths considering characteristics of traffic flowing from the IP network A to the IP networks C to E. The backup LSP_backup and label switching path LSP_A share a band in a link connecting the MPLS core routers R4 and R5. While the link connecting the MPLS core routers R4 and R5 has a link band of 10 Gbps, each of the backup LSP_backup and label switching path LSP_A has a subscribed band of 11 Gbps which is an over subscription (a band subscription in excess of a utilizable bandwidth). Therefore, when traffic of the subscribed band of backup LSP_backup and traffic of the subscribed band of label switching path LSP_A flow into the band of the link connecting MPLS routers R4 and R5 at a time, the bandwidth is exceeded and there is a possibility that congestion occurs.

The MPLS core router R1 diverts or detours traffic flowing in the label switching path LSP1, LSP2 or LSP3 to the backup LSP_backup in the event that a failure takes place in the physical links constituting the logical link A. A description will be given by taking an instance where a failure occurs in the first one of the physical links constituting the logical link A and the MPLS core router R1 detours traffic flowing in the label switching path LSP1 to the backup LSP_backup. In case all the physical links constituting the logical link A are up or occupied, the physical port Nos. 1 to 3 are selected as output physical ports for traffic in the label switching paths LSP1 to LSP3, respectively. In the event that a failure occurs in the physical port No. 1, the MPLS core router R1 detours only traffic flowing in the label switching path LSP1 to the backup LSP_backup.

On the assumption that the MPLS core routers R1 and R2 are connected together through a single physical link of 10 Gbps and the physical link becomes faulty, every traffic flowing in respective ones of the label switching paths LSP1 to LSP3 is detoured to the backup LSP_backup. Then, if traffic of 8 Gbps to be flown in the label switching path LSP_A flows in the link interconnecting the MPLS core routers R4 and R5, delay and congestion result. In addition, in the event that a failure takes place in the MPLS core router R2, communication is disabled in all of the physical links constituting the logical link A and therefore, every traffic flowing in respective ones of label switching paths LSP1 to LSP3 is caused to be diverted to the backup LSP_backup. To overcome the inconvenience as above, in the present embodiment, traffic is detoured to the backup LSP_backup in accordance with a faulty link, so that congestion does not occur in the link connecting the MPLS core routers R4 and R5 unless all the physical links constituting the logical link A become faulty or a failure takes place in the MPLS core router R2. In addition, traffic flowing in each of the label switching paths LSP2 and LSP3 remains unchanged and an optimum path is subsequently selected as a forwarding path for the traffic.

The MPLS core router R1 includes a means for storing detour priority degrees in respect of the individual label switching paths and detouring traffic on the basis of the detour priority degrees. For example, it is presupposed that VoIP traffic, mail traffic and file forwarding traffic flow in the label switching paths LSP1 to LSP3, respectively. Since the mail traffic in label switching path LSP2 is less affected by delay and congestion, a custodian of MPLS core router R1 sets the detour priority of the label switching path LSP2 to a maximum level. The VoIP traffic flowing in the label switching path LSP1 is largely affected by a delay and therefore the custodian of MPLS core router R1 sets the detour priority of the label switching path LSP1 to a minimum level. The detour priority of the label switching path LSP3 is set to a mid level between the detour priority levels of the label switching paths LSP1 and LSP2. In the event that a failure occurs in a physical link constituting the logical link A, the MPLS core router R1 compares the detour priority with the number of sound physical links and makes a detour, starting with traffic flowing in a label switching path for which an inequality of (physical link number (count))<(detour priority of LSP) stands. In the above example, the MPLS core router R1 starts a detour from the mail traffic less affected by delay but keeps the VoIP traffic sensitive to a delay forwarded sequentially through an optimum path.

In this manner, in the event of occurrence of a failure in a physical link constituting the logical link A, the MPLS core router R1 detours, to the backup LSP, traffic for which the physical link is selected as an output port. Since other traffic than the above traffic flowing in the above logical link can remain unchanged, traffic flowing in an unsuited path can be minimized. Further, only the traffic flowing in the link suffering from the occurrence of a failure is detoured to the backup LSP and consequently, occurrence of congestion (packet discard) in the detour destination can be suppressed.

(2) Outline of Router

Figure 2:
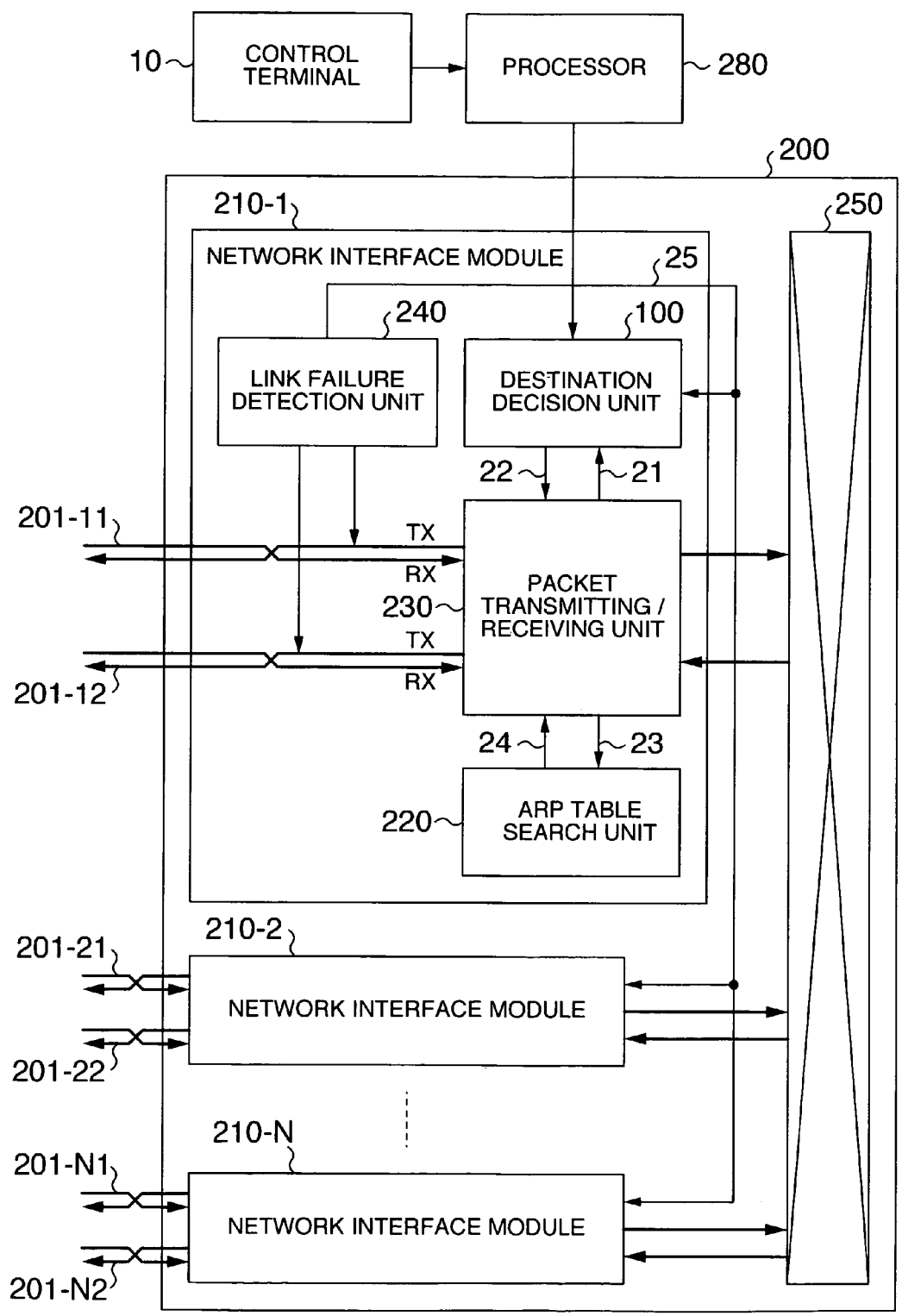
FIG. 2 is a block diagram showing an example of construction of a router 200 corresponding to R1 in FIG. 10.

Turning now to FIG. 2, an example of construction of a router 200 applicable to the MPLS core router R1 is illustrated in block diagram form. The router 200 comprises N network interface modules 210-$i$ (i=1 to N), 2N physical links 201-$ij$ (i=1 to N, j=1 or 2) accommodated by individual network interface modules, a switching fabric 250 for coupling the network interface modules 210-$i$ together, and a single processor 280. Each of the network interface modules 210-$i$ includes a packet transmitting/receiving unit 230 for performing a process of transmitting/receiving packets, a link failure detection unit 240 for detecting failures in links, a destination decision unit 100 characteristic of the present embodiment and an ARP table search unit 220. Operation of the router 200 will be outlined hereunder by making reference also to FIGS. 8 and 5.

Figure 8:
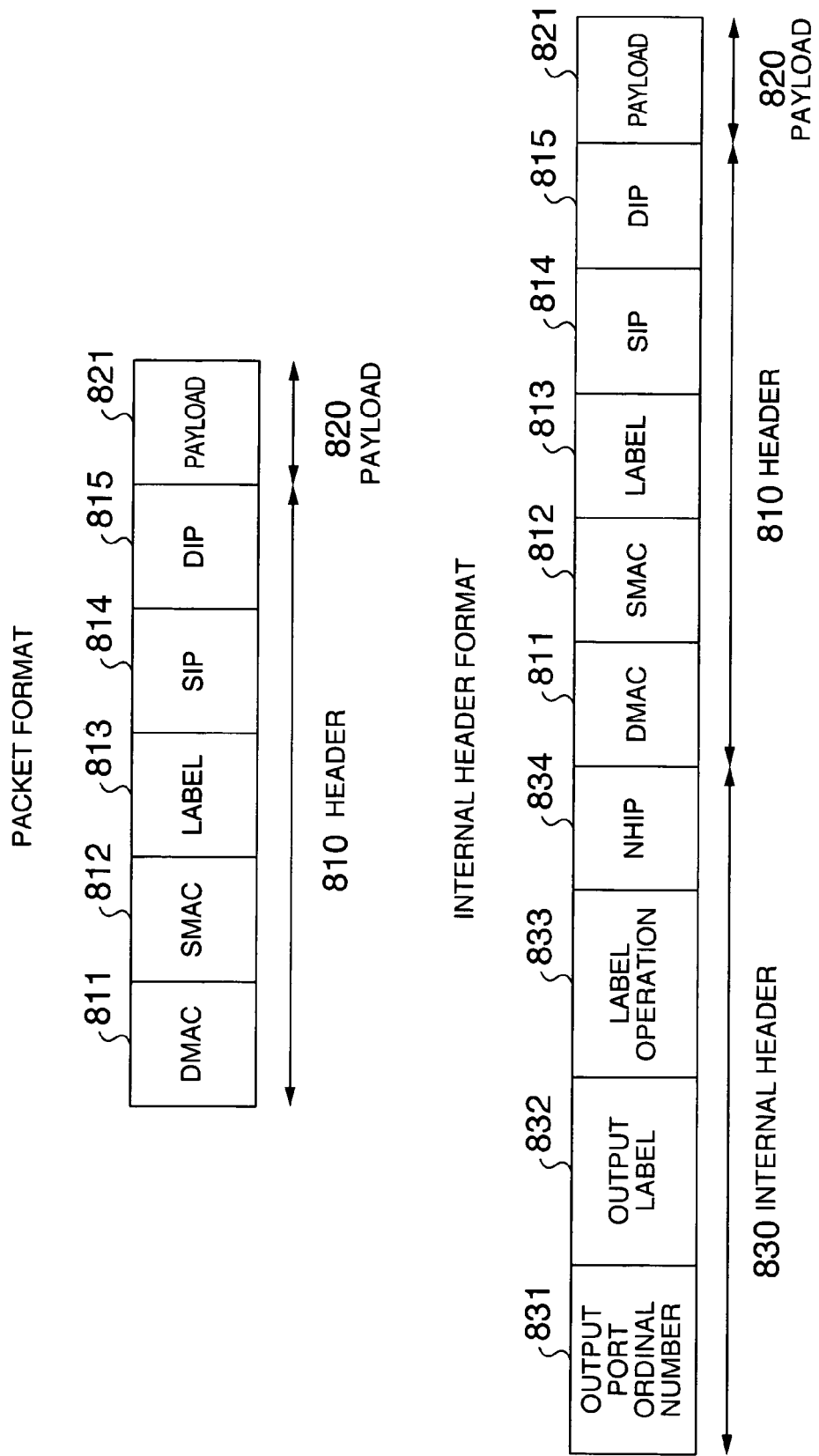
FIG. 8 is a diagram showing an example of a packet transmitted/received by the router 200 and an example of a packet format in the router 200.

An example of format of a packet inputted/outputted to/from the physical link 201 is illustrated at upper part in FIG. 8. This format is comprised of a header 810 and a payload 820. The payload 820 has a field of user payload 821. The header 810 has fields of destination MAC address (hereinafter abbreviated as "DMAC") 811, source MAC address (hereinafter abbreviated as "SMAC"), label 813 for indicating forwarding destinations of packets in the MPLS network, source IP address SIP814 and destination IP address DIP815.

Illustrated at lower part in FIG. 8 is an example of an internal packet format in the router 200. In this format, an internal header 830 is added to the packet format described in connection with upper part in FIG. 8. The internal header 830 includes fields of output port ordinal number 831 having an entry of a physical link ordinal number to which a packet is outputted, output label 832 written to the packet when the packet is outputted, label operation 833 for the label 813 and next hop IP address 834 (hereinafter abbreviated as "NHIP") having an entry of an IP address of the next router or terminal which receives the packet. The label operation referred to herein is sorted into three kinds of push for stacking label by one, pop for removing label by one and swap for exchanging label 813 with output label 832.

Figure 5:
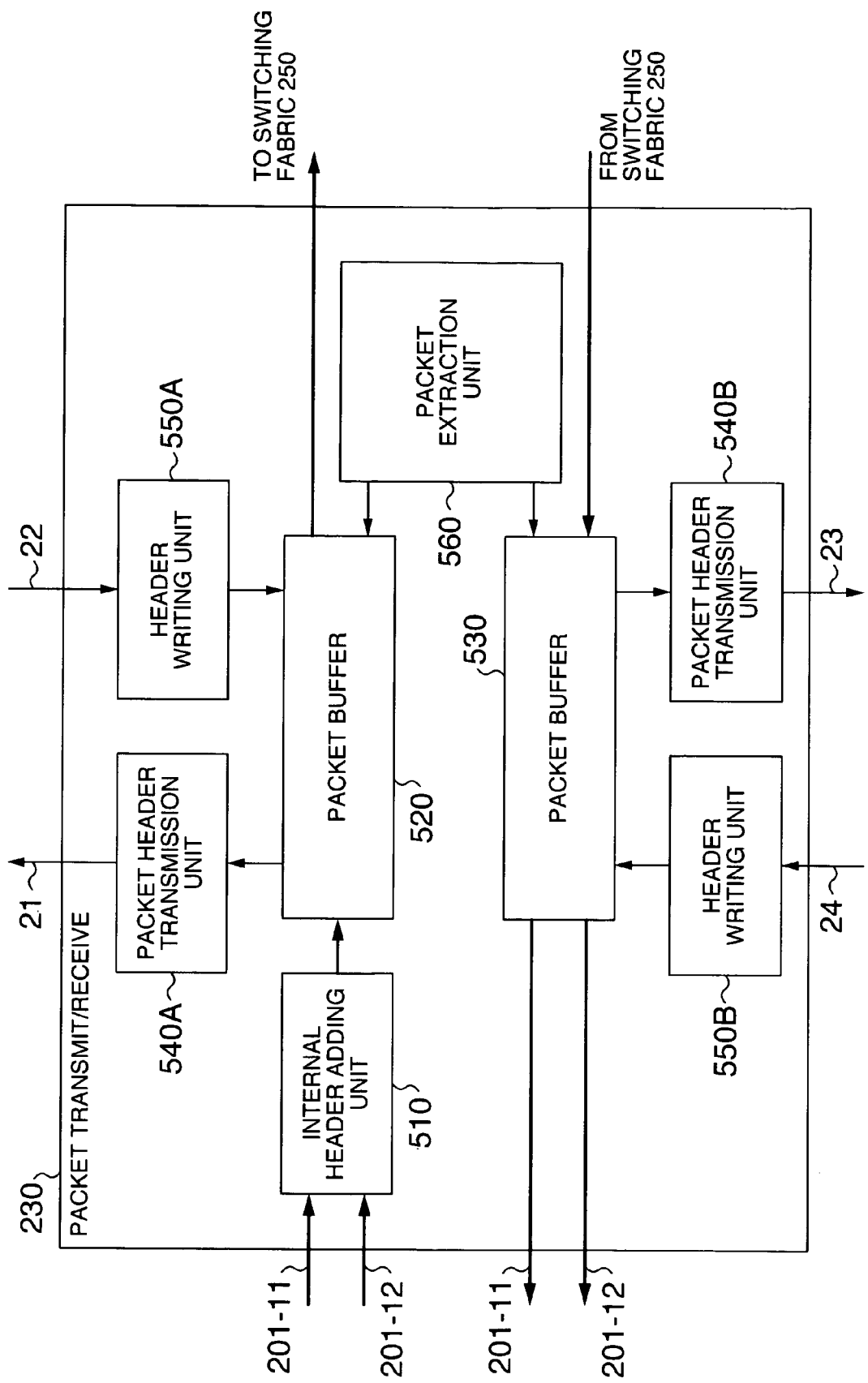
FIG. 5 is a block diagram showing an example of construction of a packet transmitting/receiving circuit 230 in FIG. 2.

The packet transmitting/receiving unit 230 in FIG. 2 is exemplarily constructed as illustrated in block diagram form in FIG. 5. When a packet is inputted from a physical link 201, an internal header adding unit 510 adds an internal header 830 to the packet and a resulting packet is written into a packet buffer 520. A packet header transmission unit 540A transmits, as packet header information 21, a header 810 stored in the packet buffer 520 to the destination decision unit 100 in FIG. 2. At that time, individual fields in the internal header have meaningless entries or values and subsequently, they are written with meaningful values by means of a header writing unit 550A.

The destination decision unit 100 having received the packet header information 21 from the packet transmitting/receiving unit 230 carries out a destination decision process on the basis of at least one piece of information of the header 810 in the packet header information 21 and transmits packet output port information 22 to the header writing unit 550A included in the packet transmitting/receiving unit 230. In the packet header 810, information of label 813 is concerned with the MPLS core router and information of destination IP address DIP815 or destination MAC address DMAC811 is concerned with the entrance edge router. In the present embodiment, the MPLS core router R1 is adopted as an MPLS core router for explaining a destination decision process based on the label 813 in header 810.

The packet output port information 22 includes at least part of the output label, label operation, link ordinal number allotted to the physical link 201 and next hop IP address. In the case of an output port being a logical interface having a plurality of aggregated physical ports, a selected one of the physical ports is used as the output port. For example, when a packet added with a label 20 is received from the label edge router LER1 in FIG. 10, the next hop IP address is selected from 192.168.0.2 allotted to the logical link A of MPLS core router R2 and the output label 200 and output port ordinal number are selected from ordinal numbers allotted to the physical links constituting the logical link A. For selection of the output physical port ordinal number, a method using a Hash function to output any one of values of 1 to 3 may be exemplified.

The destination decision unit 100 has the function of adding a backup label (a label added to a packet to be forwarded along the backup LSP) to a packet added with a protected label (a label added to a packet to be forwarded along the protected LSP) and diverting a resulting packet to the backup LSP in the event that a failure takes place in a physical link constituting the logical link.

The link failure detection unit 240 constantly monitors the state of each link. As the link failure detection unit 240 finds out a link failure, it transmits, as failure occurrence port number information 25, a physical port ordinal number of the port subject to the failure to the destination decision units 100 of the individual network interface modules 210-1 to 210-N. Though not illustrated in FIG. 2, the failure occurrence port number information 25 is connected to all of the network interface modules 210-2 to 210-N.

When receiving the failure occurrence port ordinal number information 25, the destination decision unit 100 degenerates the logical link (decreasing the physical links constituting the logical link to reduce the remaining band) if the failure occurrence port ordinal number information 25 indicates a physical port ordinal number constituting the logical interface. In case an output port of the input packet is the logical interface and the port recognized as faulty through the above process is selected as the output port, the destination decision unit 100 adds a backup label to the packet so that a resulting packet may be outputted from an output port corresponding to the backup label. The destination decision unit 100 has also a mode for executing a packet detour on the basis of detour thresholds set in respect of individual protected labels. The mode will be detailed later.

When the header writing unit 550A of packet transmitting/receiving unit 230 receives the packet output port information 22, it writes the output port ordinal number, output label, output operation and next hop IP address of the packet output port information 22 into the fields of output port number 831, output label 832, label operation 833 and NHIP 834, respectively. A packet extraction unit 560 reads the stored packet out of the packet buffer 520 and transmits it to the switching fabric 250.

Receiving the packet, the switching fabric 250 transmits the packet to the packet transmitting/receiving unit 230 of a network interface module 210 corresponding to the output port ordinal number 831. The packet transmitting/receiving unit 230 stores the present packet in a packet buffer 530. A packet header transmitting unit 540B transmits, as next hop IP address information 23, the NHIP 834 of internal header 830 the present packet has to the ARP table search unit 220.

The ARP table search unit 220 has a next hop MAC address corresponding to the next hop IP address information 23 and when receiving the next hop IP address information 23, it transmits, as next hop MAC address information 24, the corresponding MAC address to a header writing unit 550B. The header writing unit 550B writes the MAC address and a MAC address allotted to a physical port corresponding to the output port ordinal number 831 the present information 24 has into fields of DMAC811 and SMAC812 of header of the packet stored in the packet buffer 530. In case the output physical port is part of the logical interface, an SMAC allotted to the logical interface is written into the SMAC 812.

Subsequently, a label 813 is rewritten in accordance with the label operation 833. With the label operation 833 indicating SWAP, the label 813 is overwritten by an output label 832. In the case of PUSH, the output label 832 is inserted between SMAC 812 and label 813. In the case of POP, the label 813 is simply deleted and a payload 821 is moved to a field directly succeeding the SMAC 812. Finally, the packet extraction unit 560 deletes the internal header 830 and transmits the stored packet to an input/output link 201 corresponding to the output port ordinal number 831.

As described above, in the event that a failure takes place in a physical link constituting the logical link, the destination decision unit 100 degenerates the logical link. When the link suffering from the failure occurrence is selected as an output port of an input packet, a backup label is added to the packet so that the packet may be outputted from a physical port or logical interface corresponding to the backup label to thereby change the output destination to a destination corresponding to the backup label. In case destinations of plural protected labels are set in the logical interface, traffic to be detoured to a backup LSP can be divided in accordance with links suffering from occurrence of failures. Accordingly, traffic flowing in a path which is not optimized can be suppressed to a minimum.

(3) Traffic Partial Detour System

Figure 1:
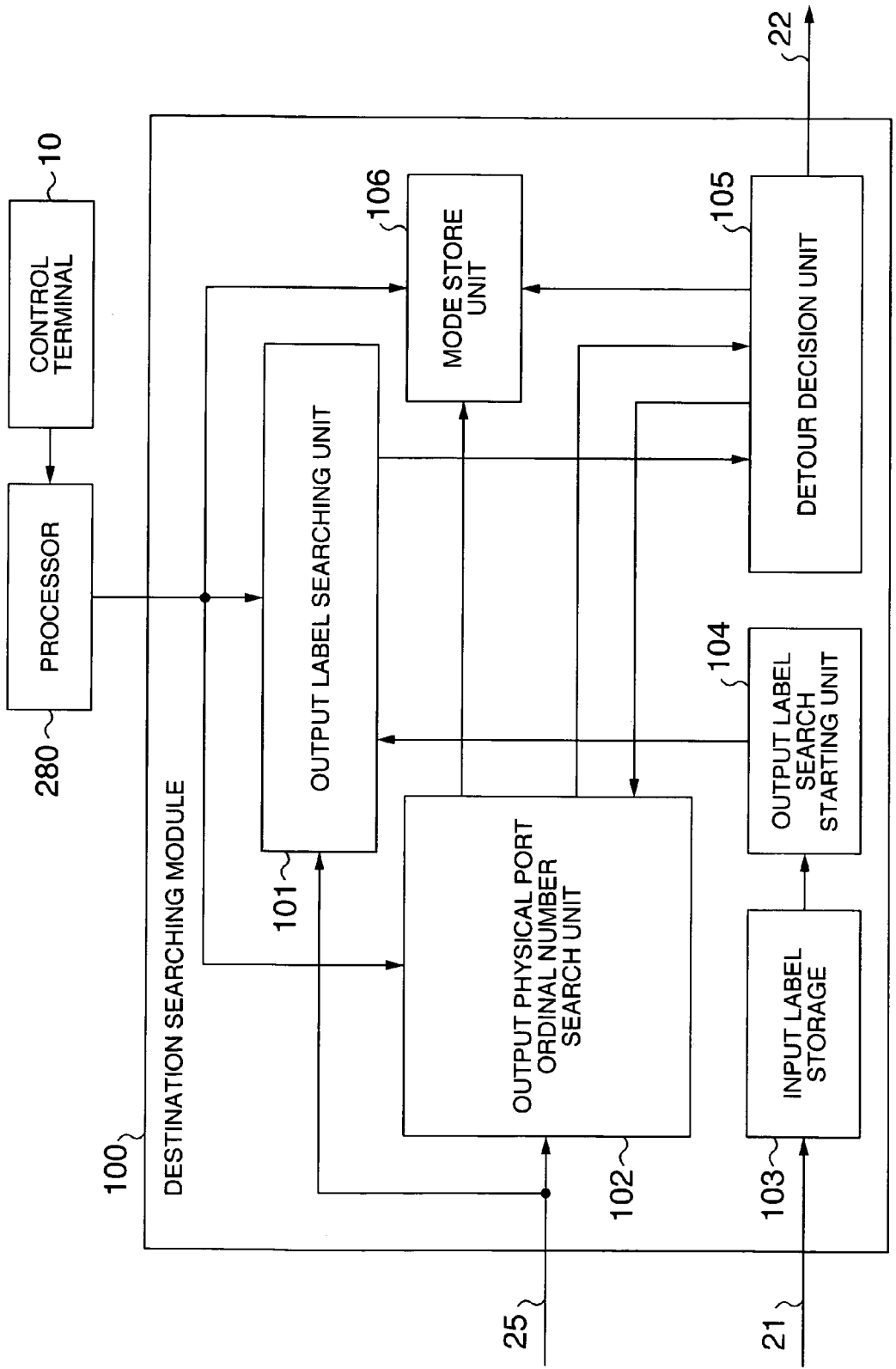
FIG. 1 is a block diagram showing an example of construction of a destination decision unit 100 in FIG. 2.

Referring now to FIG. 1, there is illustrated an example of construction of the destination decision unit 100 in FIG. 2 in block diagram form. The destination decision unit 100 includes an output label searching unit 101, an output physical port ordinal number search unit 102, an input label storage 103, an output label search starting unit 104 and a detour decision unit 105.

Figure 3:
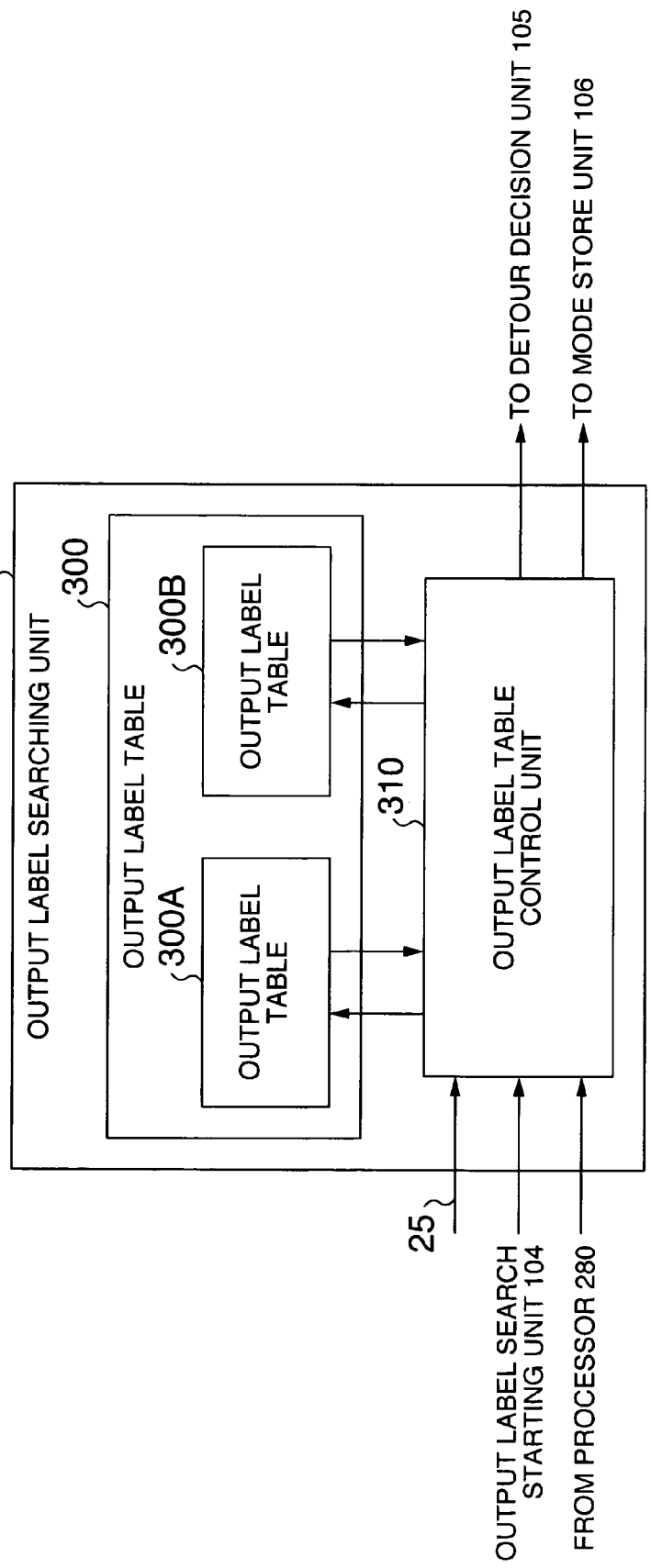
FIG. 3 is a block diagram showing an example of construction of an output label searching unit 101 in FIG. 1.

The output label searching unit in FIG. 1 is constructed as exemplified in a block diagram of FIG. 3. The output label searching unit 101 includes an output label table 300A corresponding to the protected LSP's, an output label table 300B corresponding to the backup LSP and an output label table control unit 310. An example of each of the output label tables 300A and 300B is depicted in FIG. 6. The output label table 300A includes fields of output label corresponding to an input label, label operation, NHIP, output port ordinal number, detour threshold and logical interface bit. The detour threshold indicates detour thresholds in respect of the individual LSP's. How to use the detour threshold will be described later. The logical interface bit indicates that an output port is a logical interface set up by bundling a plurality of physical links. When the logical interface bit is "1", the output port ordinal number coincides with the logical interface ordinal number. With the logical interface bit being "0", the output port ordinal number coincides with an ordinal number allotted to an input/output physical port. The output label table 300B is formulated by excluding the field or column of logical interface bit from the constituent fields of output label table 300A.

When receiving packet header information 21, the destination decision unit 100 stores information of input label 813 in the input label storage 103. Thereafter, the output label search starting unit 104 commands the output label searching unit 101 to make a search and transmits, as a search key, the input label 813 stored in the input label storage 103.

Receiving an output label table search command and the input label 813 from the output label search starting unit 104, the output label table control unit 310 of output label searching unit 101 handles a value of the input label 813 as an address corresponding to entries of the output label table 300A and output label table 300B to read the entries of the corresponding address. In this phase, pieces of entry information of both the output label tables 300A and 300B are extracted. For example, when the value of input label is 20, entries corresponding to address 20 in the output label tables 300A and 300B are read. The entry information of valid bit, output label, label operation, NHIP, output port ordinal number, detour threshold and logical interface bit, read out of each of the output label tables 300A and 300B, is transmitted to the detour decision unit 105.

The detour decision unit 105 confirms the valid bit of the entry information of each of the label tables 300A and 300B received from the output label searching unit 101. The valid bit being "0" indicates invalidity of the entry information. In the event that the entry information of both the tables is invalid, no destination is determined and the input packet is eventually discarded. If the entry information of output label table 300B is invalid, the backup label for the input packet does not exit, signifying the absence of detour path. If the entry information of output label table 300A is invalid but the entry information of output label table 300B is valid, the destination of the input packet follows the entry information of output label table 300B. In other words, delivery to a detour path is determined.

In case the entry information of the output label table 300A or 300B is valid, the detour decision unit 105 confirms whether the logical interface bit of the entry information is "1". The logical interface bit of the entry information of output label table 300A or 300B being "1" indicates that the output port ordinal number is of the logical interface. In order to determine an output port out of physical ports constituting the logical interface indicated by the output port ordinal number, the detour decision unit 105 transmits a search command and the output port ordinal number of the entry information of output label table 300 to the output physical port ordinal number search unit 102. Concurrently with forwarding the search command to the output physical port ordinal number search unit 102, the detour decision unit 105 transmits thereto the header 810 of the input packet, for instance, as the information for selecting a physical port. The search command to the output physical port ordinal number search unit 102 is issued in the case where the logical interface bit of the entry information of either or both of the output label tables 300A and 300B is "1". In the present embodiment, a description will be given by taking an instance in which an output port determined as a result of searching the output label table 300A is a logical interface.

Figure 4:
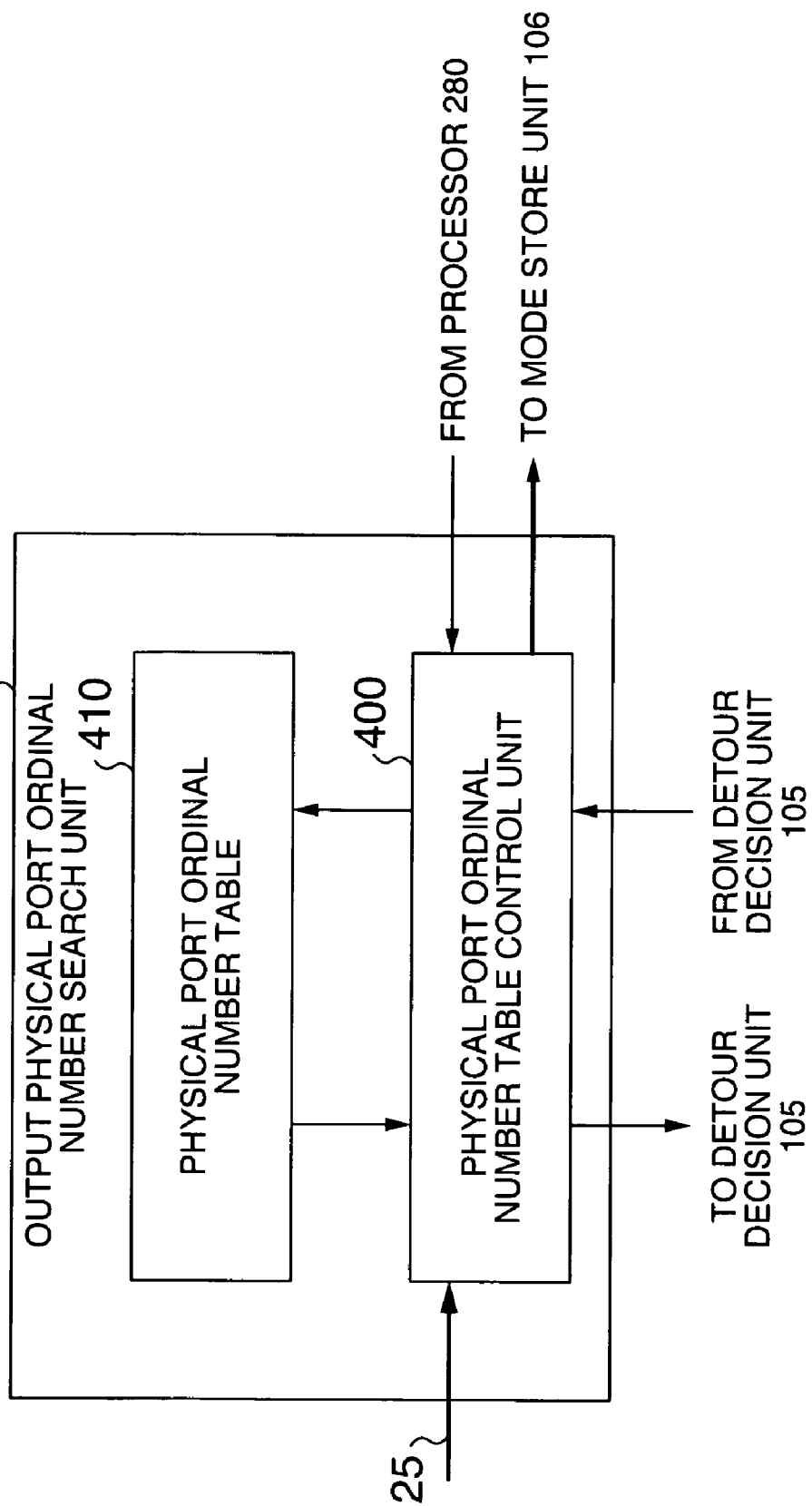
FIG. 4 is a block diagram showing an example of construction of an output physical port number search unit 102 in FIG. 1.

Next, an example of construction of the output physical port ordinal number search unit 102 in FIG. 1 will be described with reference to FIG. 4. The output physical port ordinal number search unit 102 includes a physical port number table 410 and a physical port ordinal number table control unit 400.

Turning to FIG. 7, an example of the physical port ordinal number table 410 is depicted therein. The physical port ordinal number table 410 is a table for managing physical ports constituting a logical interface. The physical port ordinal number table 410 includes fields of valid bit of entry, logical port ordinal number and physical port number or count indicative of the number of physical ports constituting the logical interface as well as a section of physical port ordinal number field recording ordinal numbers of physical ports constituting the logical interface. Stored in individual fields of the section of logical port ordinal number field are physical port ordinal numbers. Ordinal numbers allocable to physical ports are 1 to 2N and therefore, when a physical port ordinal number stored in the physical port ordinal number field is "0", the output port is faulty, failing to communicate.

When the physical port ordinal number table control unit 400 receives a search command and the header 810 of an input packet, it reads table entries in order of smaller addresses. Logical port ordinal numbers of readout entries are compared with the output port number received from the detour decision unit 105 and an entry succeeding in the first coincidence is adopted as a result of search. Thereafter, one physical port ordinal number is determined from the physical port ordinal number field of that entry. For determination of the physical port ordinal number, a method using a Hash function Hn(x) is conceivable. With the Hn(x), one of integers 1 to n is outputted as a Hash value for argument x. The output port ordinal number table control unit 400 selects a Hash function Hn(x) corresponding to "n" representing the valid output port ordinal number obtained from searching the physical port ordinal number table 410. For example, in the case of the output port ordinal number being "3", a Hash function H3(x) is selected.

Used as argument of Hn(x) in the present embodiment is the label 813 in header 810 received from the detour decision unit 105. The output port ordinal number table control unit 400 selects, as an output port ordinal number stored in the physical port ordinal number field extracted in the process designated by the result of Hn(x). With the output port ordinal number determined, the output port ordinal number table control unit 400 transmits to the detour decision unit 105 entries of the physical port number or count and physical port ordinal number field in physical port number table 410 extracted in the aforementioned process.

When the detour decision unit 105 receives the physical port number and physical port number field from the physical port ordinal number table control unit 400, it decides whether the physical port ordinal number is "0". In the case of the physical port ordinal number being "0", a physical port corresponding to the physical port ordinal number is faulty and fails to communicate and a result of searching the label table 300B is adopted as packet output port ordinal number information 22. In case the physical port ordinal number takes a value other than "0", the entry information of label table 300A received from the output label searching unit 101 is adopted as packet output port ordinal number information 22. The detour decision unit 105 transmits, as packet output port ordinal number information 22, to the packet transmitting/receiving unit 230 the output label, label operation and NHIP representing the results of searching the label table 300A or 300B adopted in the aforementioned process and the output port ordinal number received from the detour decision unit 105.

In the foregoing, the traffic detouring method carried out by the destination decision unit 100 has been described. Next, a process to be effected by the destination decision unit 100 in the event of occurrence of a failure in a physical link will be described.

When the physical port ordinal number table control unit 400 in destination decision unit 100 receives faulty port ordinal number information 25, it searches the physical port ordinal number table 410 by using the faulty port ordinal number information 25 as a key. If the port ordinal number is found in the physical port ordinal number field of physical port ordinal number table 410, a physical port ordinal number stored in the physical port ordinal number field is rewritten to "0". The above process is for determining that the physical port determined to correspond to the faulty port ordinal number information 25 through the detour decision process by the detour decision unit 105 becomes faulty and fails to communicate. For example, when the physical port ordinal number "1" fails to communicate, the value stored in "1" of entry 410-1 of physical port ordinal number field of the physical port ordinal number table 410 shown in FIG. 7 is changed to "0".

As described above, the destination decision unit 100 includes the output label table 300A corresponding to the protected LSP and the output label table 300B corresponding to the backup LSP. When an output port corresponding to readout entry information of the output label table 300A is a logical interface, one of physical links constituting the logical link is selected as an output port. In the event that a failure takes place in the physical link, entry information of the output label table 300B is used as a destination of an input packet and a detour of the packet is realized. Accordingly, in case a failure takes place in a physical link constituting the logical link A, the router 200 can output a packet, for which the faulty physical link is selected as an output port, from a sound port corresponding to a backup label. Since, excepting that packet, packets flowing in the logical link can remain unchanged, traffic to be passed through the unsuited path can be suppressed to a minimum. Further, since only traffic flowing in the link which becomes faulty and fails to communicate is detoured to the backup LSP, generation of congestion (packet discard) in the detour destination can be suppressed. And besides, in the event that a failure occurs in the next hop node, the physical port ordinal numbers of all physical ports connected to the next hop node are rendered "0" in the physical port ordinal number table 410, thereby making it possible to detour all traffic flowing in the logical interface to the backup LSP.

The custodian of router 200 performs setting of the output label table 300 from a control terminal 10 provided externally of the router 200. An example of commands inputted to the control terminal 10 when setting the output label table 300A or 300B is shown in FIG. 9. A command 901 in FIG. 9 informs the destination decision unit 100 of router 200 that configuration or setting for an input label 20 is started. A command 910 sets a destination for the input label 20. A lexicon 911 declares that an output label 200 is to be swapped for the input label 20. A lexicon 912 declares that a next hop IP address for the input label 20 is 192.168.0.2. A lexicon 913 declares that in setting an output port, a logical interface la1 is an output port. When the command 910 is inputted from the control terminal 10, the output label table control unit 310 receiving the command through the processor 280 writes 200, SWAP, 192.168.0.2, "1", "1", and "1" into the output label, label operation, NHIP, output port ordinal number, logical interface bit and valid bit of the output label table 300A, respectively. Subsequently, a command 920 sets a backup LSP for the input label 20. A lexicon 921 declares that setting of the backup LSP is started. A lexicon 922 declares that the output label is 2000. A lexicon 923 declares that the next hop of input label 20 is 192.168.5.2. A lexicon 924 declares that the output port ordinal number is "4". When the command 920 is inputted from the control terminal 10, the output label table control unit 310 receiving the command through the processor 280 writes 2000, SWAP, 192.168.5.2, "4", "0" and "1" into the output label, label operation, NHIP, output port ordinal number, logical interface bit and valid bit of the output label table 300B, respectively.

(4) Partial Detour Method with Priority

Next, an embodiment of traffic detour decision based on detour thresholds stored in individual cells of the output label table 300A in destination decision unit 100 will be described. According to the traffic detour method, when a failure occurs in a physical link constituting the logical link, the order of traffic detour can be changed in accordance with characteristics of traffic. For example, detour can be started with traffic immune to delay, followed by forwarding of traffic sensitive to delay through an optimum path. The destination decision unit 100 includes a mode store unit 106 concerning detour. The mode store unit 106 included in the destination decision unit 100 stores mode information of binary values concerning detour (Explained later). The mode information expresses an operation mode of the physical port ordinal number table control unit 400. The physical port ordinal number table control unit 400 then refers to the mode information stored in the mode store unit 106. On the basis of the mode information stored in the mode store unit 106, the output physical port ordinal number search unit 102 and physical port ordinal number table control unit 400 decide whether operation is to be carried out pursuant to the traffic partial detour method or partial detour method with priority.

A process to be performed by the output physical port ordinal number search unit 102 in the event of a link failure will first be described. When receiving faulty port ordinal number information 25, the physical port ordinal number table control unit 400 in output physical port ordinal number search unit 102 searches the physical port ordinal number table 410 by using the port ordinal number as a search key. The individual entries are read in order of smaller addresses in the physical port ordinal number table 410 and an output port ordinal number stored in the physical port ordinal number field corresponding to the entry is compared with the faulty port ordinal number information 25. In case the faulty port ordinal number information 25 coincides with the physical port ordinal number stored in the physical port ordinal number field, the following process is carried out. More particularly, it is now assumed that the physical port ordinal number coincident with the faulty port ordinal number information 25 is stored in a physical port ordinal number field M corresponding to an address N. Then, a physical port ordinal number field designated by the physical port number (count) in the entries corresponding to the address N, that is, a physical port ordinal number of the last physical port ordinal number field is read. Subsequently, the last value of the physical port ordinal number field is written into the physical port ordinal number field M corresponding to the address N and "0" is written into the last value of the physical port ordinal number field. Then, "1" is subtracted from the number of physical port corresponding to the address N. By performing the above process, the physical links constituting the logical link can be reduced in number and in the detour decision unit 105, the traffic detour process based on the detour threshold can be executed.

Next, a traffic detour decision process by the detour decision unit 105 will be described. Receiving a physical port ordinal number and a physical port number (count) from the physical port ordinal number table control unit 400, the detour decision unit 105 compares the physical port number with a detour threshold in entry information of output label table 300A received from the output label table control unit 310. In case the physical port number is below the detour threshold (physical port number<detour threshold), the entry information of the output label table 300B is transmitted, as packet output port information 22, to the packet transmitting/receiving unit 230. If the physical port number is equal to or greater than the detour threshold (physical port number>=detour threshold), a result of searching the output label table 300A is transmitted, as packet output port information 22, to the packet transmitting/receiving unit 230. The physical port number of count received from the physical port ordinal number table control unit 400 expresses the remaining band or the number or count of remaining physical links of logical link. By comparing the detour threshold set in the output label table 300A with the physical port number, it is determined which one of results of searching the output label tables 300A and 300B is adopted as the packet output port information 22. For example, when a packet added with label 20 is received with the output label table 300 placed in condition as shown in FIG. 6, the detour threshold is 3. Since the physical port number is 3 in the physical port ordinal number table 410 in FIG. 7, the condition of (output port number>=detour threshold) stands and the output port is any one of "1", "2" and "3". And also, when a packet added with label 21 is received under the same condition, (output port number<detour threshold) stands and an output port ordinal number "4" corresponding to an entry of address 21 in the output label table 300B is adopted as the output port.

It is to be noted that in the present embodiment, the method of sequentially watching the valid bit of the selected physical port (traffic partial detour method) and the method of comparing the number of valid physical ports with the detour priority (partial detour method with priority) are materialized by switching the mode and are not realized at a time but they can be materialized concurrently by providing, for example, mode bits in respect of the individual entries of the physical port ordinal number table 410. In this case, however, the modes are merged into the logical interface and they cannot be changed in accordance with every traffic (flow).

(5) User Interface

In setting a detour threshold in the router 200, a command as exemplified in FIG. 9 is inputted to the control terminal 10. A command 931 in FIG. 9 informs the destination decision unit 100 of router 200 that configuration for an input label 20 is started. A command 940 sets a destination for the input label 20. A lexicon 941 declares that an output label 200 is to be swapped for the input label 20. A lexicon 942 declares that a next ho IP address for the input label 20 is 192.168.0.2. A lexicon 943 declares that in setting an output port, the output port is a logical interface 1. A lexicon 944 declares that the threshold value is "10". When the command 940 is inputted from the control terminal 10, the output label table 310 receiving that command through the processor 280 writes 200, SWAP, 192.168.0.2, "1", "3", "1" and "1" into the output label, label operation, NHIP, output port, detour threshold, logical interface bit and valid bit of the output label table 300A, respectively. Subsequently, a command 950 sets a backup LSP for the input label 20. A lexicon 951 declares that setting of the backup LSP is started. A lexicon 952 declares that the output label is 2000. A lexicon 953 declares that a next hop for the input label 20 is 192.168.5.2. A lexicon 954 declares that the output port ordinal number is a physical port ordinal number 4. When the command 950 is inputted from the control terminal 10, the output label table control unit 310 receiving that command through the processor 280 writes 2000, SWP, 192.168.5.2, "4", "0" and "1" into the output label, label operation, NHIP, output port ordinal number, logical interface bit and valid bit of the output label table 300B, respectively.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet forwarding apparatus, comprising:
   a plurality of network interface modules each including a packet transmitting/receiving unit for transmitting/receiving packets to/from a plurality of physical links connected to said plurality of network interface modules;
   a physical link store unit for storing a plurality of physical links and a logical link of link aggregation aggregated thereto by making the correspondence of the logical link to said plurality of physical links;
   a first packet switching fabric connected to said plurality of physical links for forwarding packets from/to a packet transmitting/receiving unit of said plurality of network interface modules;
   an output label store unit for storing output labels and output labels for backup to be added to packets received by said packet transmitting/receiving unit by making the correspondence of the output labels with the logical link;
   an output label searching unit for searching said output label store unit for a first output label to be added to said packet and for a first logical link to output said packet on the basis of an input label of a packet received by said packet transmitting/receiving unit;
   a physical link search unit for searching said physical link store unit for a first physical link to output said packet from among said plurality of physical links of said logical link of link aggregation;
   a failure detection unit for detecting failures in said plurality of physical links; and
   a detour decision unit for determining, when a failure has been detected by said failure detection unit in said first physical link belonging to the first physical link searched by said physical link search unit, a second label for backup to be added to said packet in place of said first label and for determining a second physical link or a second logical link connected to a second packet switching fabric in place of said first logical link searched by said output label searching unit.

2. A packet forwarding apparatus according to claim 1, wherein the logical link of said link aggregation is formed between said packet forwarding apparatus and other packet forwarding apparatuses connected thereto through a plurality of physical links of said plurality of network interface modules, and is degenerated if a failure occurred on any physical link of the logical link.

3. A packet forwarding apparatus according to claim 1, wherein said first input and output labels and said output label for backup are labels of Multi Protocol Label Switching MPLS.

4. A packet forwarding apparatus, comprising:
   a plurality of network interface modules each including a packet transmitting/receiving unit for transmitting/receiving packets to/from a plurality of physical links connected to said plurality of network interface modules;
   a failure detection unit for detecting failures in said plurality of physical links;
   a physical link store unit for storing a plurality of physical links, a logical link of link aggregation aggregated thereto, and number of physical links with no failure detected by said failure detection unit by making the correspondence thereamong;
   a first packet switching fabric connected to said plurality of physical links for forwarding packets from/to a packet transmitting/receiving unit of said plurality of network interface modules;
   an output label store unit for storing output labels, output labels for backup to be added to packets, and a detour threshold value received by said packet transmitting/receiving unit by making the correspondence of the input labels of packets received by said packet transmitting/receiving unit;
   an output label searching unit for searching said output label store unit for a first output label to be added to said packet and for a first logical link to output said packet, and said detour threshold value on the basis of an input label of a packet received by said packet transmitting/receiving unit;
   a physical link search unit for searching said physical link store unit for a first physical link to output said packet from among said plurality of physical links of said logical link of link aggregation and said number of physical links with no failure detected; and
   a detour decision unit for comparing said number of physical links from said physical link search unit with said detour threshold value from said output label searching unit, for determining, when said number of physical links from said physical link search unit is less than said detour threshold value from said output label searching unit, a second label for backup to be added to said packet in place of said first label and for determining a second physical link or a second logical link connected to a second packet switching fabric in place of said first logical link searched by said output label searching unit.

5. A packet forwarding apparatus according to claim 4, wherein the logical link of said link aggregation is formed between said packet forwarding apparatus and other packet forwarding apparatuses connected thereto through a plurality of physical links of said plurality of network interface modules, and is degenerated if a failure occurred on any physical link of the logical link.

6. A packet forwarding apparatus according to claim 4, wherein said first input and output labels are labels of Multi Protocol Label Switching MPLS.

7. A packet forwarding apparatus, comprising:
   a plurality of network interface modules each including a packet transmitting/receiving unit for transmitting/receiving packets to/from a plurality of physical links connected to said plurality of network interface modules;
   a physical link store unit for storing a plurality of physical links and a logical link of link aggregation aggregated thereto by making the correspondence of the logical link to said plurality of physical links;
   a first packet switching fabric connected to said plurality of physical links for forwarding packets from/to a packet transmitting/receiving unit of said plurality of network interface modules;
   an output label store unit for storing output labels and output labels for backup to be added to packets received by said packet transmitting/receiving unit by making the correspondence of the output labels with the logical link;
   an output label searching unit for searching said output label store unit for a first and a second output labels to be added to said packet and for a first and a second links to output said packet on the basis of an input label of a packet received by said packet transmitting/receiving unit;

a physical link search unit for determining whether or not said first link is a logical link, and for searching, when said first link is a logical link, with said first link said physical link store unit for a first physical link to output said packet from among said plurality of physical links of said first link;

a failure detection unit for detecting failures in said plurality of physical links; and a detour decision unit for determining, when a failure has not been detected by said failure detection unit in said first physical link belonging to the first physical link searched by said physical link search unit, said first label from said physical link search unit to be added to said packet and for determining said first physical link from said physical link search unit to output said packet, for determining, when a failure has been detected by said failure detection unit in said first physical link belonging to the first physical link searched by said physical link search unit, said second label to be added to said packet in place of said first output label from said output label searching unit, and for determining said second link to output said packet in place of said first physical link searched by said physical link search unit.

* * * * *